(12) United States Patent
Ahn et al.

(10) Patent No.: US 10,705,663 B2
(45) Date of Patent: Jul. 7, 2020

(54) TOUCH SCREEN HAVING FINGERPRINT RECOGNITION FUNCTION AND DISPLAY DEVICE HAVING THE SAME

(71) Applicant: Samsung Display Co., Ltd., Yongin-Si, Gyeonggi-Do (KR)

(72) Inventors: Soon Sung Ahn, Yongin-si (KR); Hyoung Wook Jang, Yongin-si (KR); Hyun Jae Na, Yongin-si (KR); Mu Gyeom Kim, Yongin-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 16/457,329

(22) Filed: Jun. 28, 2019

(65) Prior Publication Data

US 2019/0324576 A1 Oct. 24, 2019

Related U.S. Application Data

(62) Division of application No. 15/463,874, filed on Mar. 20, 2017, now Pat. No. 10,379,684.

(30) Foreign Application Priority Data

Apr. 8, 2016 (KR) .......................... 10-2016-0043725

(51) Int. Cl.
*G06F 3/044* (2006.01)
*G06K 9/00* (2006.01)

(52) U.S. Cl.
CPC ........... *G06F 3/044* (2013.01); *G06K 9/0002* (2013.01); *G06F 2203/0338* (2013.01); *G06F 2203/04112* (2013.01)

(58) Field of Classification Search
CPC ........... G06F 3/044; G06F 2203/04112; G06F 2203/0338; G06K 9/0002
See application file for complete search history.

(56) References Cited

U.S. PATENT DOCUMENTS 8,564,314 B2 10/2013 Shaikh et al.
8,787,632 B2 7/2014 Dean et al.
(Continued)

FOREIGN PATENT DOCUMENTS

CN 104881196 A 9/2015
KR 10-2012-0138887 A 12/2012
(Continued)

OTHER PUBLICATIONS

European Search Report corresponding to EP Application No. 17165450.2, dated May 24, 2018. The Extended European Search Report discloses that present invention is relevant to paragraphs [0004], [0018] to [0025] and [0032] to [0040] of the prior art reference CN 104881196 A.

*Primary Examiner* — Kwang-Su Yang
(74) *Attorney, Agent, or Firm* — Innovation Counsel LLP

(57) ABSTRACT

A touch screen including a substrate that includes an active area and a non-active area adjacent to the active area, the active area including at least one fingerprint recognition area; touch sensing electrodes including first sensing electrodes arranged in the active area, and at least one second sensing electrode arranged in the fingerprint recognition area, the second sensing electrode configured for sensing a touch and recognizing a fingerprint; and a pad portion provided with a plurality of pads which are electrically connected to respective sensing electrodes, wherein the at least one second sensing electrode includes: a plurality of sub electrodes extending in a direction inclined with respect to an edge portion of the active area; and a plurality of fingerprint recognition lines connecting the sub electrodes to the pad portion, and the fingerprint recognition lines arranged in a same fingerprint recognition area extend in a same direction.

5 Claims, 11 Drawing Sheets

(56) References Cited

U.S. PATENT DOCUMENTS

| | | |
|---|---|---|
| 9,329,742 B2 | 5/2016 | Yi et al. |
| 9,773,148 B2 * | 9/2017 | Mo ................... G06F 3/0416 |
| 2012/0090757 A1 | 4/2012 | Buchan et al. |
| 2014/0069796 A1 | 3/2014 | Kang et al. |
| 2014/0138638 A1 | 5/2014 | Bae et al. |
| 2014/0145977 A1 | 5/2014 | Kang |
| 2014/0285728 A1 | 9/2014 | Lee |
| 2014/0375597 A1 | 12/2014 | Park et al. |
| 2015/0205418 A1 | 7/2015 | Nam et al. |
| 2015/0277643 A1 | 10/2015 | Kim |
| 2016/0034068 A1 | 2/2016 | Sohn et al. |
| 2016/0042215 A1 * | 2/2016 | Wang ............... G06K 9/00087 |
| | | 382/124 |
| 2016/0073528 A1 | 3/2016 | Park et al. |
| 2016/0364593 A1 | 12/2016 | Lee et al. |
| 2017/0091508 A1 | 3/2017 | Han et al. |

FOREIGN PATENT DOCUMENTS

| | | |
|---|---|---|
| KR | 10-1502326 B1 | 3/2015 |
| KR | 10-2015-0087811 A | 7/2015 |

\* cited by examiner

TOUCH SCREEN HAVING FINGERPRINT RECOGNITION FUNCTION AND DISPLAY DEVICE HAVING THE SAME

CROSS-REFERENCE TO RELATED APPLICATION

This application is a divisional application of U.S. patent application Ser. No. 15/463,874 filed on Mar. 20, 2017, which claims priority under 35 USC § 119 to Korean patent application number 10-2016-0043725 filed on Apr. 8, 2016, the entire disclosures of which are incorporated herein in their entirety by reference.

BACKGROUND

Field of Invention

The present disclosure relates generally to flat panel displays, and more specifically to a touch screen and a display device having the same.

Description of Related Art

A display device that includes a touch screen has been the subject of recent development efforts. The touch screen is a type of information input device. A user may press or touch a touch sensor in the touch screen to input information, while viewing an image being realized on the display panel.

Some recent development efforts have focused on touch screens that include a fingerprint recognition sensor. The touch screen that includes the fingerprint recognition sensor is being developed with a touch sensing area and a separate fingerprint recognition area that are different from each other. Therefore, an area of the touch sensing area on the touch screen may be reduced.

SUMMARY

A purpose of the present disclosure is to provide a touch screen having a fingerprint recognition function.

Another purpose of the present disclosure is to provide a display device provided with the touch screen.

According to an embodiment of the present disclosure, there is provided a touch screen including a substrate that includes an active area and a non-active area arranged to be adjacent to the active area, the active area including at least one fingerprint recognition area; touch sensing electrodes including first sensing electrodes arranged in the active area and at least one second sensing electrode arranged in the fingerprint recognition area, the second sensing electrode configured for sensing a touch and recognizing a fingerprint; and a pad portion including a plurality of pads which are electrically connected to respective sensing electrodes. The at least one second sensing electrode includes: a plurality of sub electrodes extending in a direction inclined with respect to an edge portion of the active area; and a plurality of fingerprint recognition lines connecting the sub electrodes to the pad portion, and the fingerprint recognition lines arranged in a same fingerprint recognition area extend in a same direction.

The first sensing electrodes may be arranged in the active area and outside the fingerprint recognition area. The plurality of sub electrodes may be a plurality of first sub electrodes. The at least one sensing electrode may include a plurality of second sub electrodes arranged on an insulating film covering the first sub electrodes, and extending in a direction intersecting the first sub electrodes; and the fingerprint recognition lines connecting the first sub electrodes and the second sub electrodes to the pad portion.

The fingerprint recognition lines may include first fingerprint recognition lines connecting the first sub electrodes to the pad portion; and second fingerprint recognition lines connecting the second sub electrodes to the pad portion.

The active area may include a first fingerprint recognition area and a second fingerprint recognition area that are adjacent to each other.

The touch sensing electrodes may include two second sensing electrodes which are arranged in the first fingerprint recognition area and in the second fingerprint recognition area, respectively. The first fingerprint recognition lines and the second fingerprint recognition lines of the first fingerprint recognition area may extend in a first direction, and the first fingerprint recognition lines and the second fingerprint recognition lines of the second fingerprint recognition area may extend in a second direction intersecting the first direction.

The active area may include a first fingerprint recognition area, a second fingerprint recognition area and a third fingerprint recognition area, and the second fingerprint recognition area and the third fingerprint recognition area may be arranged at either side of the first fingerprint recognition area. The first sub electrodes of the first fingerprint recognition area may extend to one of the second fingerprint recognition area and the third fingerprint recognition area, and may be electrically connected to the second sub electrodes of one of the second fingerprint recognition area and the third fingerprint recognition area. The second sub electrodes of the first fingerprint recognition area may extend to the other one of the second fingerprint recognition area and the third fingerprint recognition area, and may be electrically connected to the first sub electrodes of the other one of the second fingerprint recognition area and the third fingerprint recognition area.

The first sensing electrodes may include a conductive mesh having a plurality of conductive fine lines intersecting each other. A wiring density of the sub electrodes may be greater than a wiring density of the conductive fine lines.

The first sensing electrodes may include a plurality of X electrodes and a plurality of Y electrodes extending in respective directions intersecting each other. The at least one second sensing electrode may include the plurality of sub electrodes arranged only in the fingerprint recognition area, and the sub electrodes may extend in a direction parallel to at least one of the X electrodes and the Y electrodes.

A width of the X electrodes and the Y electrodes in the fingerprint recognition area may be smaller than a width of the X electrodes and the Y electrodes in an area other than the fingerprint recognition area.

The fingerprint recognition area may be arranged on or at an edge portion of the active area.

According to another embodiment of the present disclosure, there is provided a display device including a first substrate including a plurality of pixel areas; display elements arranged in the pixel areas on the first substrate; a second substrate facing the first substrate; and a touch screen arranged on one surface of the second substrate.

The aforementioned touch screen may recognize a user's fingerprint at the same time as a sensing of the user's touch input. Further, since the fingerprint may be recognized in an active area of the touch screen, an area of the active area on the touch screen may not be reduced.

BRIEF DESCRIPTION OF THE DRAWINGS

Example embodiments will now be described more fully hereinafter with reference to the accompanying drawings;

however, they may be embodied in different forms and should not be construed as limited to the embodiments set forth herein. Rather, these embodiments are provided so that this disclosure will be thorough and complete, and will fully convey the scope of the example embodiments to those skilled in the art.

Figure 1:
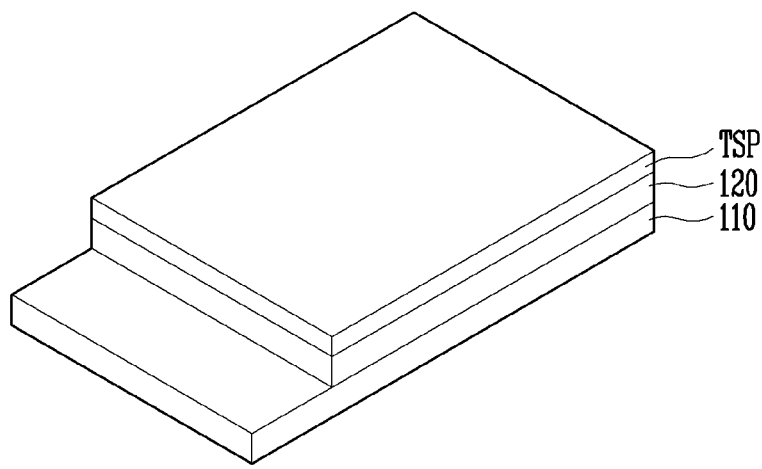

In the drawing figures, dimensions may be exaggerated for clarity of illustration. The various figures thus may not be to scale. It will be understood that when an element is referred to as being "between" two elements, it can be the only element between the two elements, or one or more intervening elements may also be present. Like reference numerals refer to like elements throughout.

Figure 2:
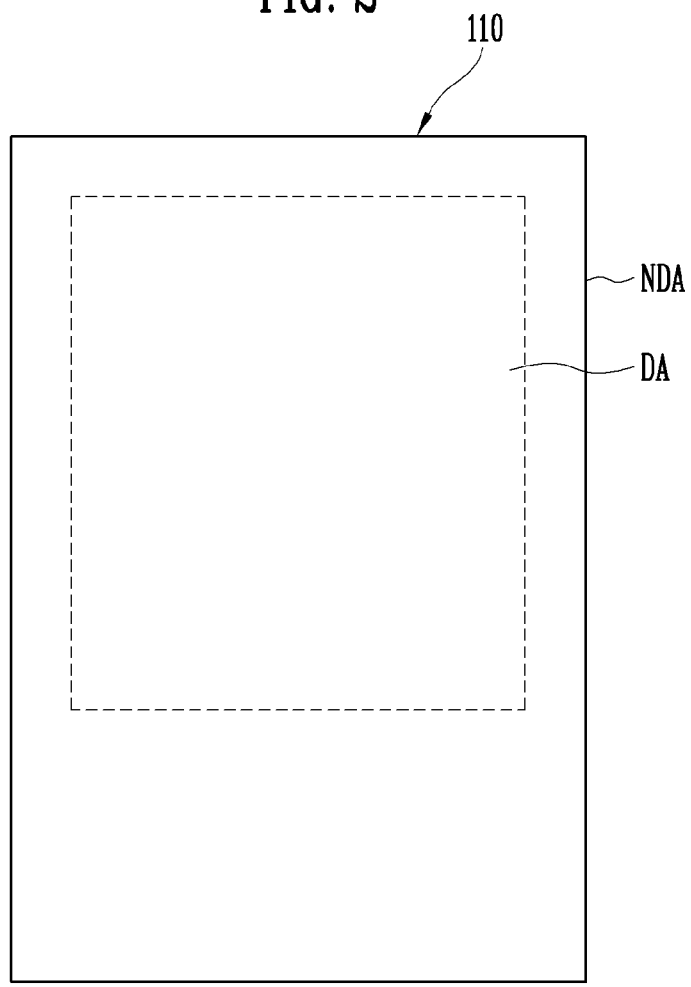
Figure 3:
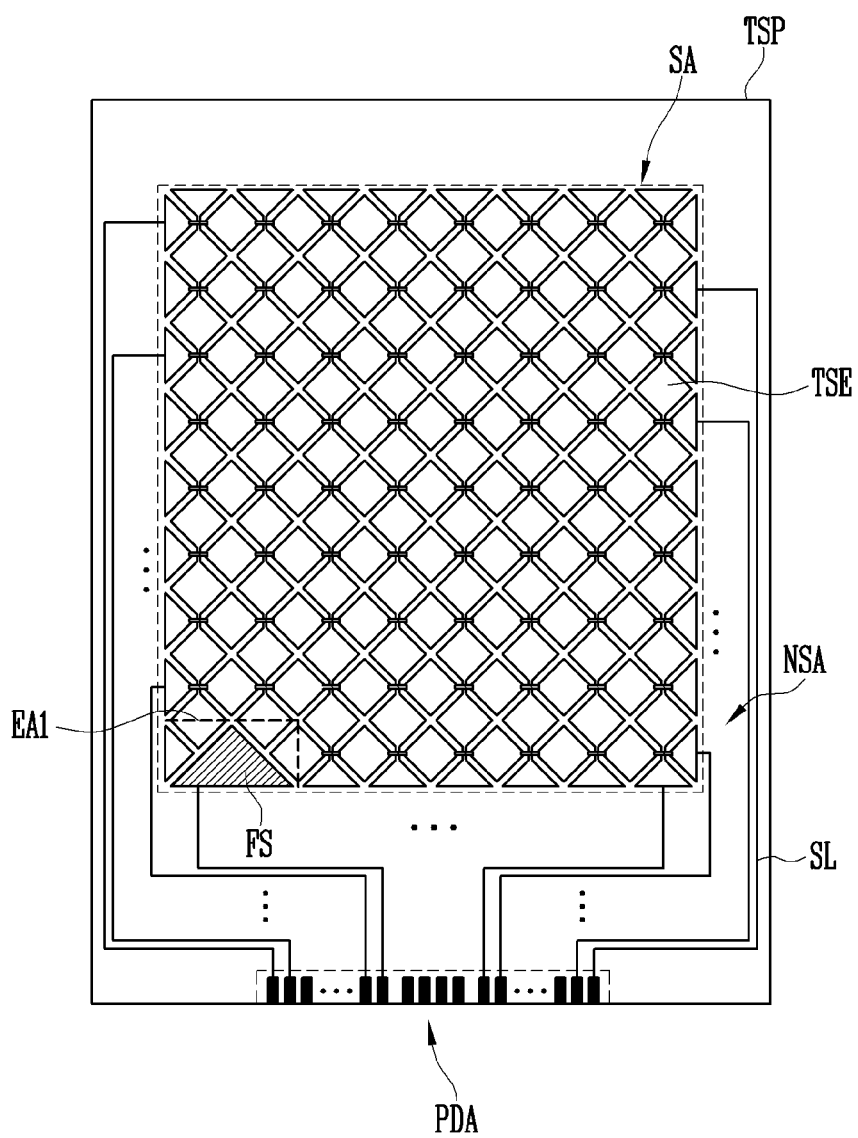
Figure 4:
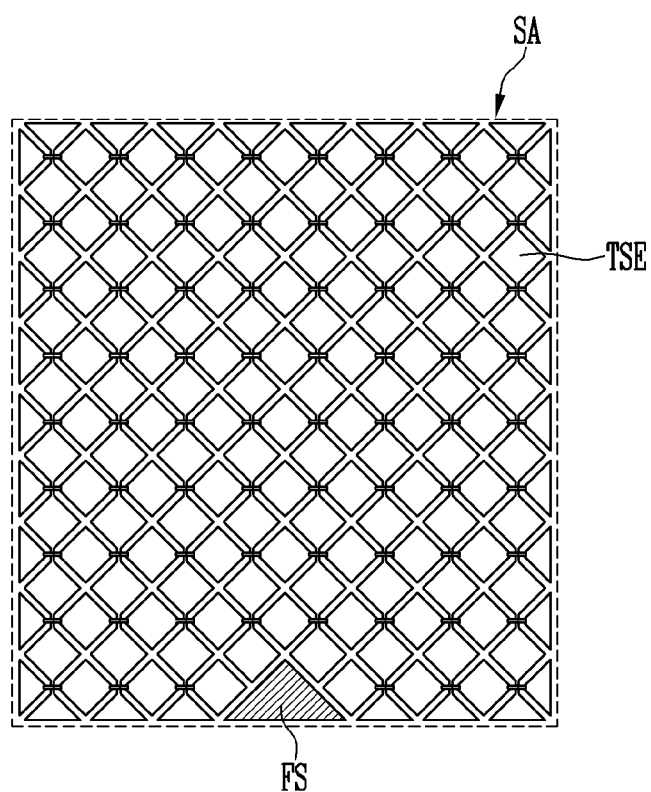
Figure 5:
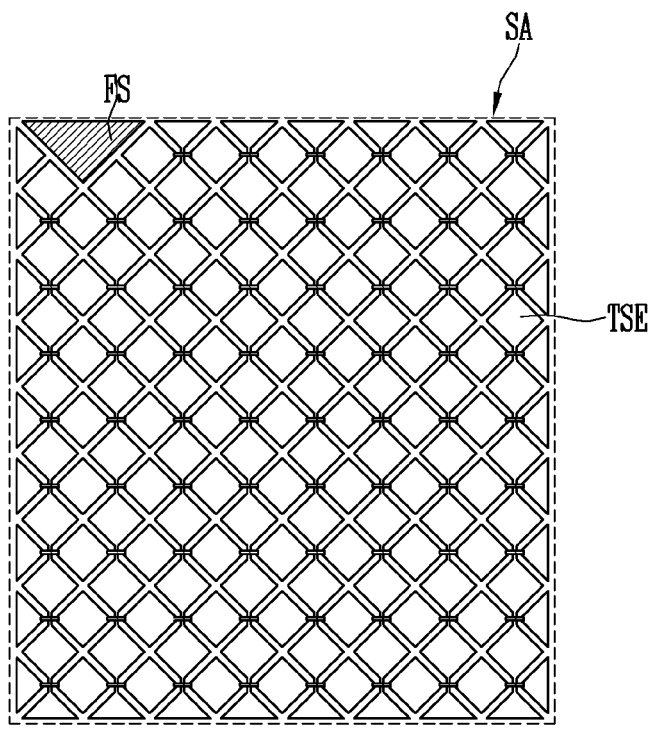
Figure 6:
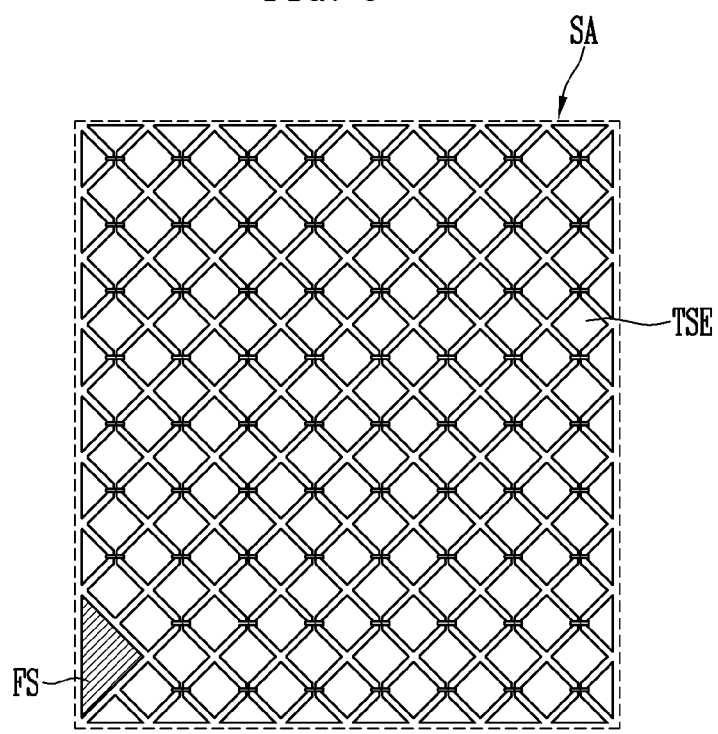
Figure 7:
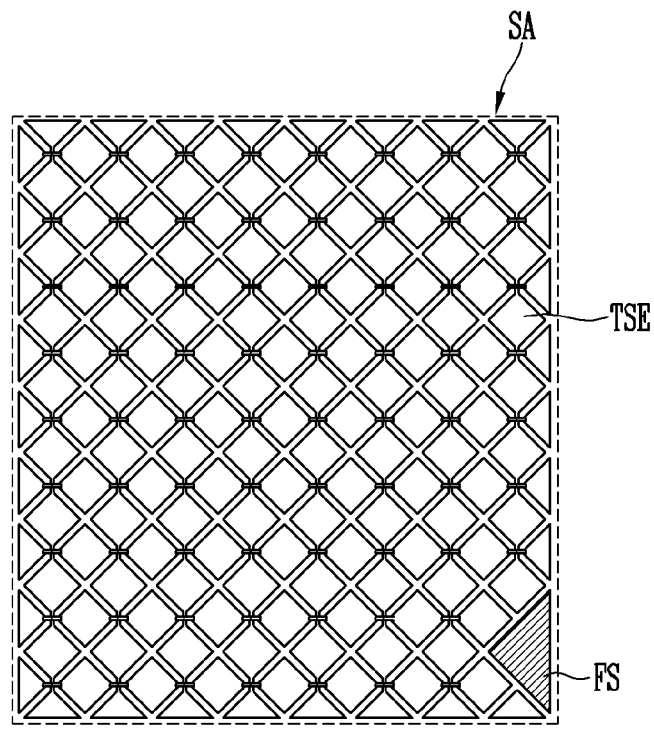
Figure 8:
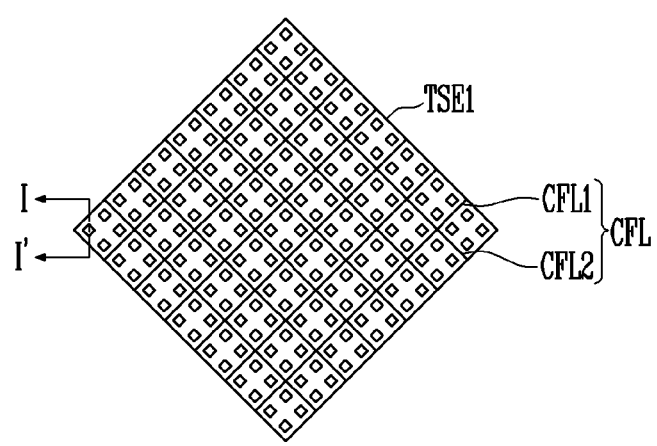
Figure 9:
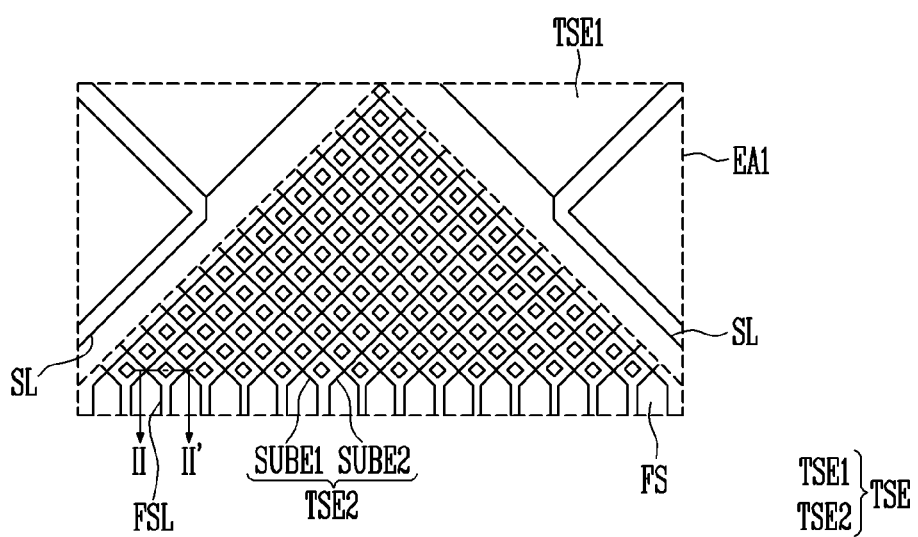
Figure 10:
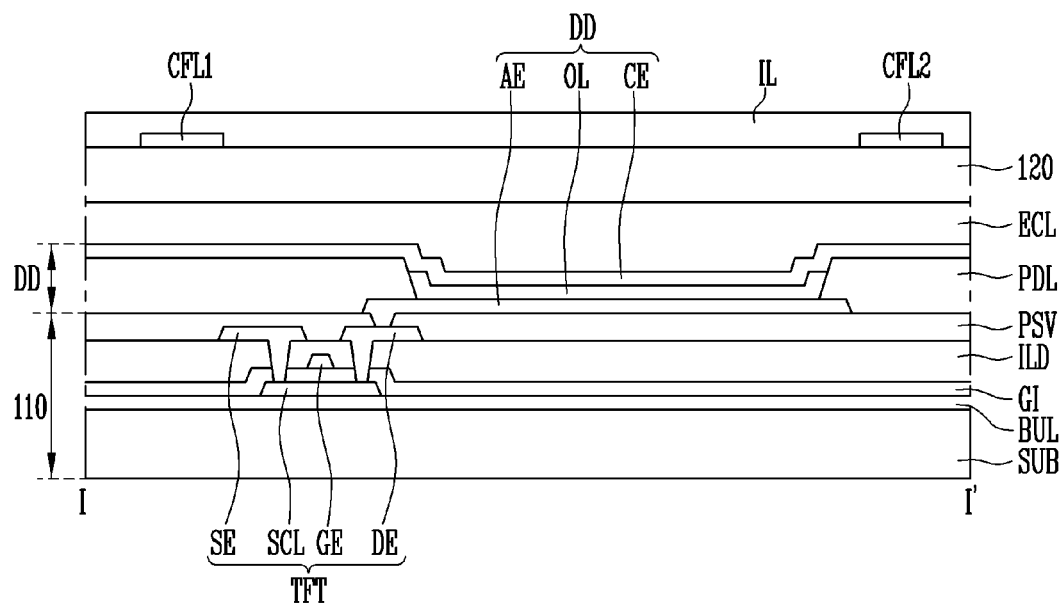
Figure 11:
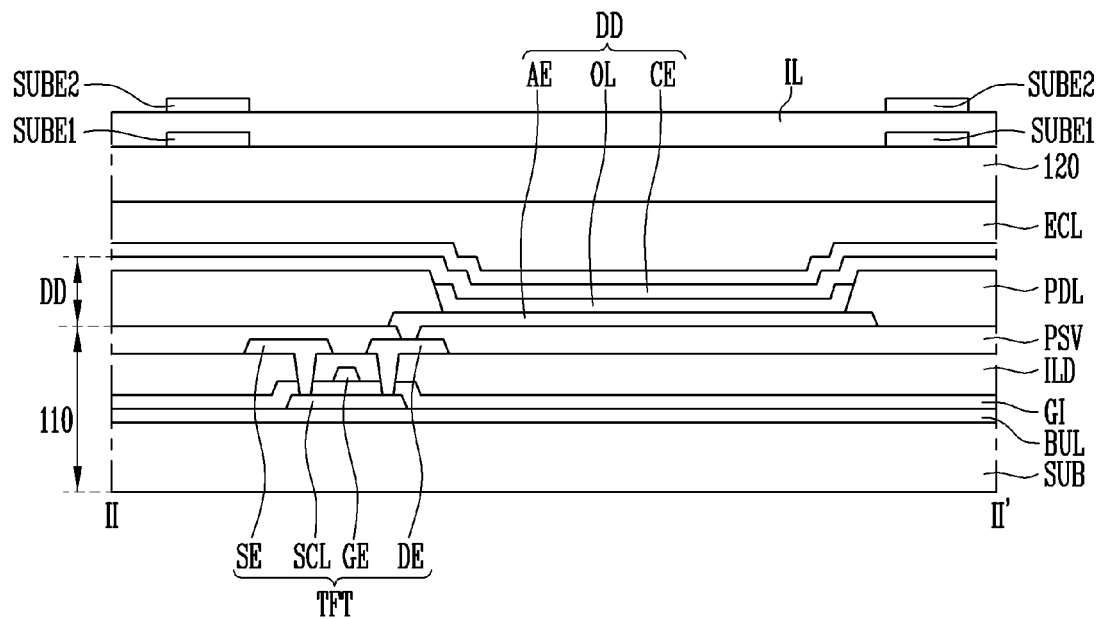
Figure 12:
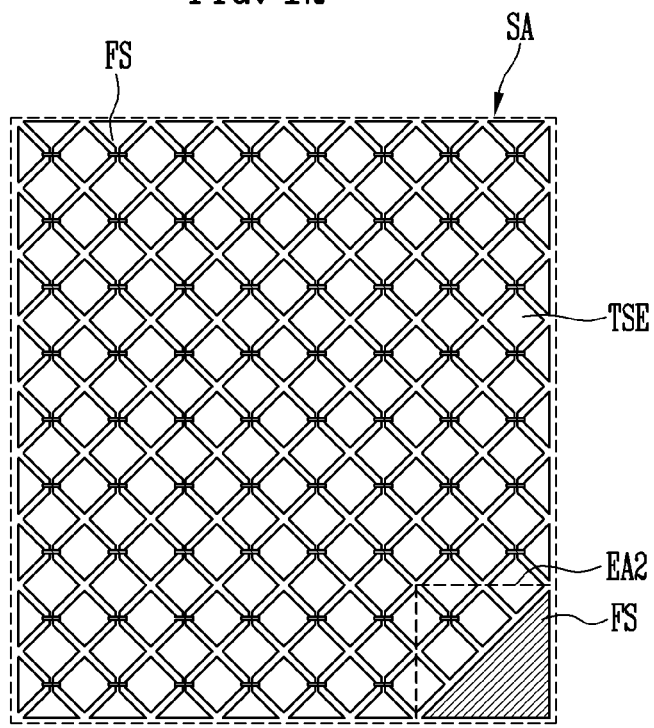
Figure 13:
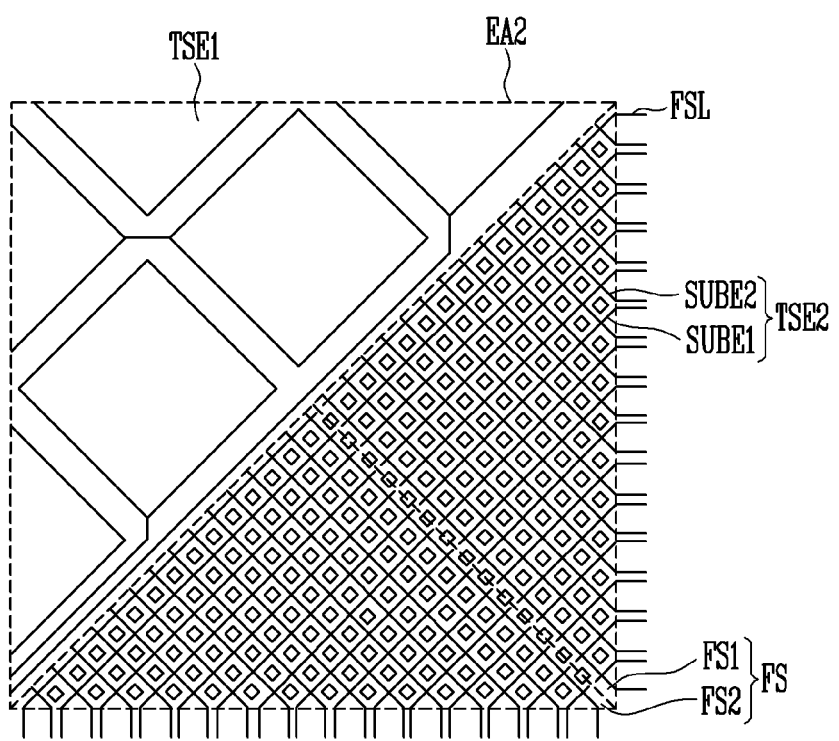
Figure 14:
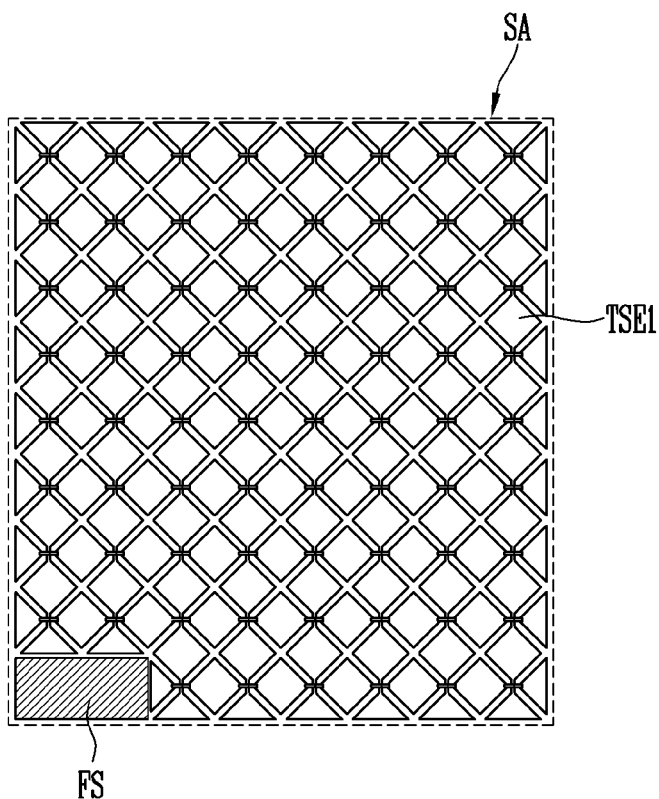
Figure 15:
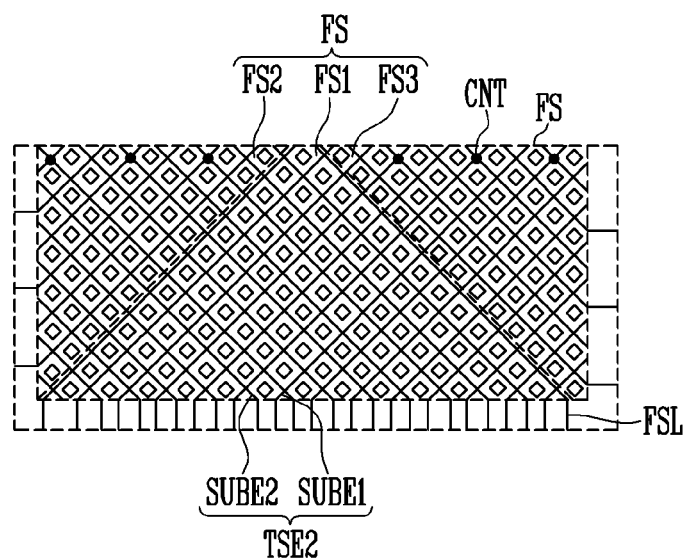
Figure 16:
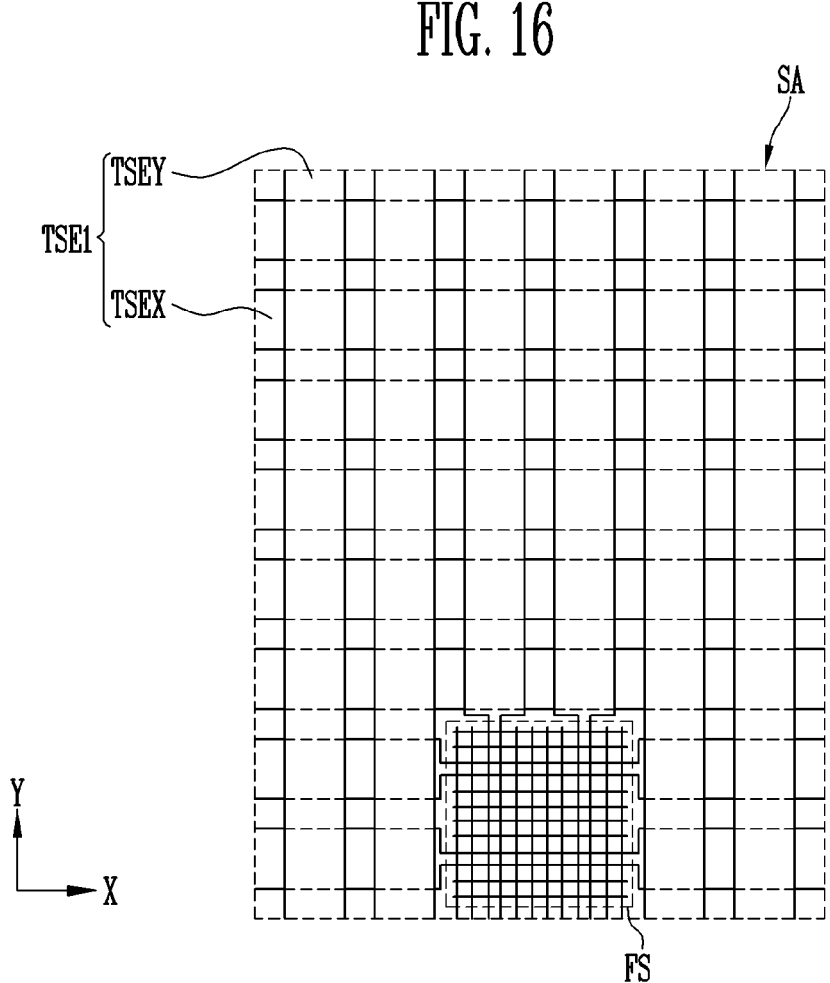
Figure 17:
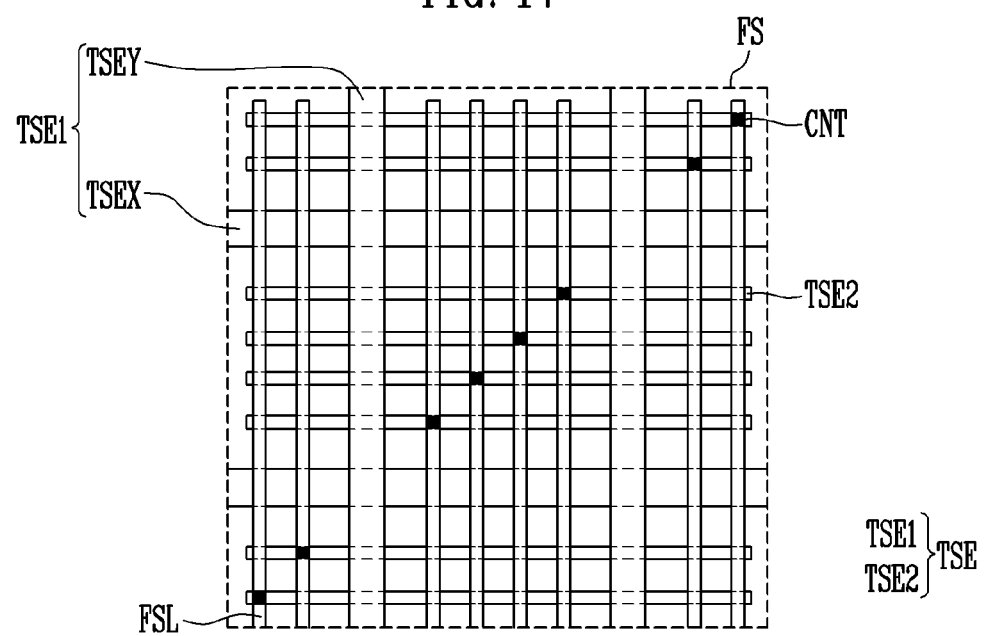
Figure 18:
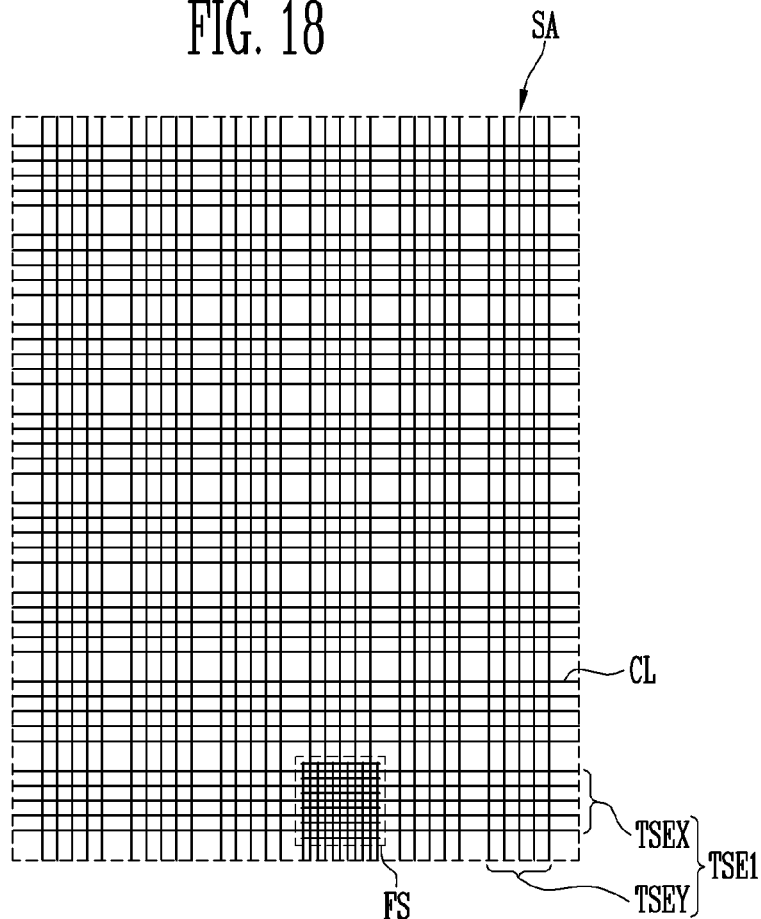
Figure 19:
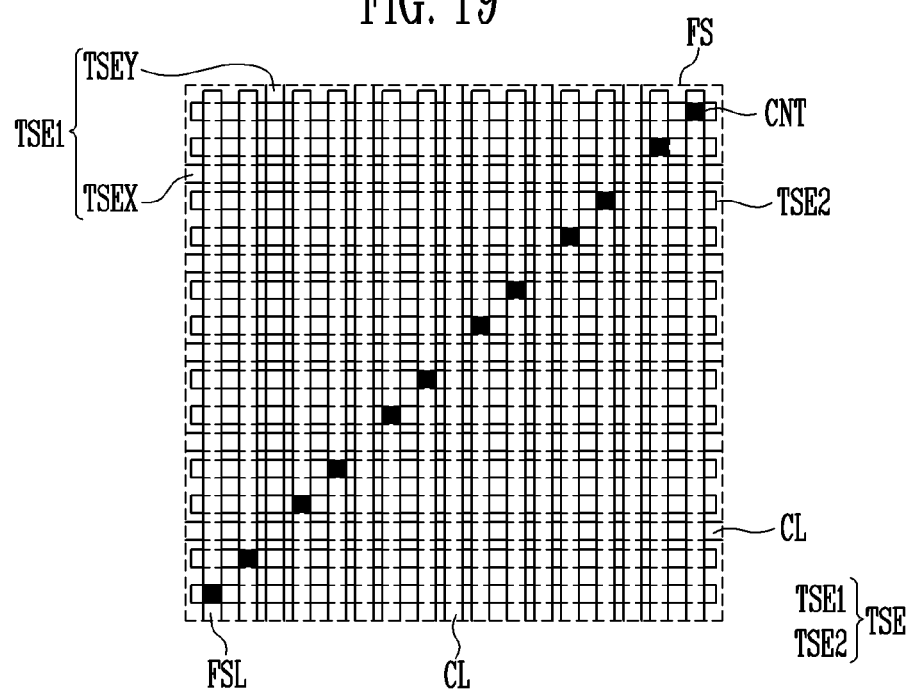

FIG. 1 is a perspective view provided to explain a display device according to an embodiment of the present disclosure;

FIG. 2 is a plan view provided to explain a first substrate of FIG. 1;

FIG. 3 is a plan view provided to explain a touch screen of FIG. 1;

FIGS. 4 to 7 are plan views provided to explain an active area of a touch screen;

FIG. 8 is a plan view provided to explain a touch sensing electrode of FIG. 3;

FIG. 9 is an enlarged view of area EA1 of FIG. 3;

FIG. 10 is a cross-sectional view taken on line I-I' of FIG. 8;

FIG. 11 is a cross-sectional view taken on line II-II' of FIG. 9;

FIG. 12 is a plan view provided to explain an active area of a touch screen applied to a display device according to another embodiment of the present disclosure;

FIG. 13 is an enlarged view of area EA2 of FIG. 12;

FIG. 14 is a plan view provided to explain an active area of a touch screen applied to a display device according to yet another embodiment of the present disclosure;

FIG. 15 is an enlarged view provided to explain a fingerprint recognition area of FIG. 14;

FIG. 16 is a plan view provided to explain an active area of a touch screen applied to a display device according to yet another embodiment of the present disclosure;

FIG. 17 is an enlarged view of fingerprint recognition area FS of FIG. 16;

FIG. 18 is a plan view provided to explain an active area of a touch screen applied to a display device according to yet another embodiment of the present disclosure; and FIG. 19 is an enlarged view of fingerprint recognition area FS of FIG. 18.

DETAILED DESCRIPTION

Hereinafter, preferred embodiments of the present disclosure will be explained in detail with reference to the drawings attached. All numerical values are approximate, and may vary. All examples of specific materials and compositions are to be taken as nonlimiting and exemplary only. Other suitable materials and compositions may be used instead.

FIG. 1 is a perspective view provided to explain a display device according to an embodiment of the present disclosure, FIG. 2 is a plan view provided to explain a first substrate of FIG. 1, FIG. 3 is a plan view provided to explain a touch screen of FIG. 1, and FIGS. 4 to 7 are plan views provided to explain an active area of a touch screen.

Referring to FIGS. 1 to 7, the display device may include a first substrate 110, display elements (not illustrated) arranged on the first substrate 110, a second substrate 120 facing the first substrate 110, and a touch screen TSP arranged on one surface of the second substrate 120.

The first substrate 110 may include a display area DA and a non-display area NDA. The display area DA may include a plurality of pixel areas. The non-display area NDA may be arranged to be adjacent to the display area DA. For example, the non-display area NDA may surround or substantially surround the display area DA.

Further, the first substrate 110 may include a plurality of gate lines (not illustrated), a plurality of data lines (not illustrated) that intersect the gate lines, and a plurality of thin film transistors (not illustrated) accessing or connected to the gate lines and the data lines. Each display element may access or be connected to one of the thin film transistors.

The display elements may be arranged on the pixel areas on the first substrate 110. The display elements may each be any one of a liquid crystal display (LCD) device, an electrophoretic display (EPD) device, an electrowetting display (EWD) device, and an organic light emitting display (OLED) device. Explanation hereinafter will be based on an assumption that the display elements are organic light emitting display devices, for convenience sake.

The display elements may include a first electrode accessing the thin film transistor, a light emitting layer arranged on the first electrode, and a second electrode arranged on the light emitting layer. The light emitting layer may include a light generating layer configured to generate light by recombination of holes and electrons being injected through the first electrode and the second electrode.

The second substrate 120 may be cohered with or affixed to the first substrate 110, thereby isolating the display elements from the external environment.

The touch screen (TSP) may be arranged on one surface of the second substrate 120, for example on an outer surface of the second substrate 120.

The touch screen (TSP) may include an active area (SA) and a non-active area (NSA). The active area (SA) may correspond to the display area (DA) of the first substrate 110. The non-active area NSA may be arranged to be adjacent to the active area SA. Further, the non-active area NSA may correspond to the non-display area NDA of the first substrate 110.

The active area SA may include at least one fingerprint recognition area FS. The fingerprint recognition area FS may be arranged at an edge portion of the active area SA.

For example, as illustrated in FIGS. 3 to 7, the fingerprint recognition area FS may be arranged along a front edge portion, a rear edge portion, a left edge portion, and/or a right edge portion of the active area SA. Further, the fingerprint recognition area FS may be arranged in center portion of the edge portions the active area SA. Explanation hereinafter will be based on an assumption that the fingerprint recognition area FS is arranged on the rear edge portion of the active area SA, for convenience sake.

Touch sensing electrodes TSE may be arranged in the active area SA. The touch sensing electrodes TSE may be connected to a pad portion PDA by sensing lines SL.

The touch sensing electrodes TSE arranged in that portion of the active area SA excluding the fingerprint recognition area FS may sense a user's touch input. As illustrated in FIG. 3, the touch sensing electrodes TSE may be mutual capacitance touch screen type sensors.

Also, the touch sensing electrodes TSE arranged in the fingerprint recognition area FS may recognize a user's fingerprint while at the same time also sensing the user's touch.

Hereinafter, the display device including the touch screen illustrated in FIGS. 1 to 7 will be explained in further detail with reference to FIGS. 8 to 11.

FIG. 8 is a plan view provided to explain the touch sensing electrode of FIG. 3, FIG. 9 is an enlarged view of area EA1 of FIG. 3, FIG. 10 is a cross-sectional view taken on line I-I' of FIG. 8, and FIG. 11 is a cross-sectional view taken on line II-II' of FIG. 9.

Referring to FIGS. 1 to 11, the display device may include the first substrate 110, the display elements DD arranged on the first substrate 110, the second substrate 120 facing the first substrate 110, and the touch screen TSP arranged on one surface of the second substrate 120.

The first substrate 110 may include the display area DA and the non-display area NDA. The display area DA may include a plurality of pixel areas. The non-display area NA may be arranged to be adjacent to the display area DA. Further, the first substrate 110 may include a base substrate SUB, and at least one thin film transistor TFT arranged on each pixel area of the base substrate SUB.

The base substrate SUB may include a transparent insulating material to transmit light. Further, the base substrate SUB may be a rigid substrate or a flexible substrate. Examples of the rigid substrate include a glass substrate, a quartz substrate, a glass ceramic substrate and a crystalline glass substrate. Examples of the flexible substrate include a film substrate and a plastic substrate containing a high molecular organic material. For example, the flexible substrate may contain one of polyethersulfone (PES), polyacrylate, polyetherimide (PEI), polyethylene naphthalate (PEN), polyethylene terephthalate (PET), polyphenylene sulfide (PPS), polyarylate (PAR), polyimide (PI), polycarbonate (PC), triacetate cellulose (TAC), and cellulose acetate propionate (CAP). Further, the flexible substrate may contain fiber glass reinforced plastic (FRP).

It may be desirable for the material of the base substrate SUB to be one that has high thermal resistance, i.e. resistance against high processing temperatures that occur when fabricating the display device.

A buffer layer BUL may be arranged between the base substrate SUB and the thin film transistor TFT. The buffer layer BUL may contain at least one of silicon oxide and silicon nitride. For example, the buffer layer BUL may include a first insulating film that contains silicon oxide, and a second insulating film that is arranged on the first insulating film and that contains silicon nitride. The buffer layer BUL may prevent impurities from diffusing from the base substrate SUB into the thin film transistor TFT. Further, the buffer layer BUL may flatten or planarize the upper surface of the base substrate SUB.

The thin film transistor TFT may be connected to a gate line and a data line. The thin film transistor TFT may include a semiconductor layer SCL, a gate electrode GE, a source electrode SE and a drain electrode DE.

The semiconductor layer SCL may be arranged on the buffer layer BUL. The semiconductor layer SCL may contain one of amorphous Si, poly crystalline Si, an oxide semiconductor and an organic semiconductor. In the semiconductor layer SCL, an area accessing the source electrode SE and the drain electrode DE may respectively be a source area and drain area where impurities are doped or injected. An area between the source area and the drain area may be a channel area.

Meanwhile, although not illustrated in the drawings, in the case where the semiconductor layer SCL contains an oxide semiconductor, a light blocking film for blocking the light entering the semiconductor layer SCL may be arranged on an upper portion or a lower portion of the semiconductor layer SCL.

A gate insulating film GI may be arranged on the semiconductor layer SCL. The gate insulating film GI may cover the semiconductor layer SCL, and insulate the semiconductor layer SCL from the gate electrode GE. The gate insulating film GI may contain at least one of silicon oxide and silicon nitride.

The gate electrode GE may be arranged on the gate insulating film GI. The gate electrode GE may access, or be in electrical communication with, the gate line. The gate electrode GE may contain a low resistance conductive material, and may be superimposed on, i.e. positioned over, the semiconductor layer SCL.

An interlayer insulating film ILD may be arranged on the gate electrode GE. The interlayer insulating film ILD may contain the same material as the gate insulating film GI. The interlayer insulating film ILD may insulate the source electrode SE and the drain electrode DE, and the gate electrode GE.

Contact holes that penetrate the gate insulating film GI and the interlayer insulating film ILD may expose the source area and the drain area of the semiconductor layer SCL.

The source electrode SE and the drain electrode DE may be arranged on the interlayer insulating film ILD such that they are spaced apart from each other. The source electrode SE and the drain electrode DE may each contain a low resistance conductive material. One end of the source electrode SE may access the data line. Another end of the source electrode SE may access the source area through one of the contact holes. One end of the drain electrode DE may access the drain area through another one of the contact holes. Another end of the drain electrode DE may access one of the display elements DD.

Meanwhile, although the present embodiment was explained based on the assumption that the thin film transistor TFT has a top gate structure, there is no limitation thereto. For example, the thin film transistor TFT may instead have a bottom gate structure.

A protection film PSV may be arranged on the base substrate SUB where the thin film transistor TFT is arranged. That is, the protection film PSV may cover the thin film transistor TFT. A portion of the protection film PSV may be removed to expose the drain electrode DE.

The protection film PSV may include at least one film. For example, the protection film PSV may include an inorganic protection film and an organic protection film arranged on the inorganic protection film. The inorganic protection film may contain at least one of silicon oxide and silicon nitride. The organic protection film may contain one of acryl, polyimide (PI), polyamide (PA) and benzocyclobutene (BCB). Further, the organic protection film may be a flattening film having transparency and liquidity to be able to flatten or planarize underlying surfaces.

The display elements DD may be arranged on the protection film PSV. The display elements DD may include a first electrode AE accessing the drain electrode DE, a light emitting layer EL arranged on the first electrode AE, and a second electrode CE arranged on the light emitting layer EL.

One of the first electrode AE and the second electrode CE may be an anode electrode, and the other one may be a cathode electrode. For example, the first electrode AE may be an anode electrode, while the second electrode CE is a cathode electrode.

Further, at least one of the first electrode AE and the second electrode CE may be a transmission type electrode.

For example, in the case where the display element DD is a rear surface light emitting type organic light emitting element, the first electrode AE may be a transmission type electrode, and the second electrode CE may be a reflection type electrode. In the case where the display element DD is a front surface light emitting type organic light emitting element, the first electrode may be a reflection type electrode, and the second electrode may be a transmission type electrode. In the case where the display element DD is a both surface light emitting type organic light emitting element, both the first electrode AE and the second electrode CE may be transmission type electrodes. In the present embodiment, explanation is based on an assumption that the display elements DD are front surface light emitting type organic light emitting elements and the first electrode AE is an anode electrode.

In each pixel area, the first electrode AE may be arranged on the protection film PSV. The first electrode AE may include a reflecting film (not illustrated) capable of reflecting light, and a transparent conductive film (not illustrated) arranged on an upper portion or a lower portion of the reflecting film. At least one of the transparent conductive film and the reflecting film may access the drain electrode DE.

The reflecting film may contain a material capable of reflecting light. For example, the reflecting film may contain at least one of aluminum (Ai), silver (Ag), chrome (Cr), molybdenum (Mo), platinum (Pt), nickel (Ni), and an alloy thereof.

The transparent conductive film may contain a transparent conductive oxide. For example, the transparent conductive film may contain a transparent conductive oxide that is at least one of indium tin oxide (ITO), indium zinc oxide (IZO), aluminum zinc oxide (AZO), gallium doped zinc oxide (GZO), zinc tin oxide (ZTO), gallium tin oxide (GTO), and fluorine doped tin oxide (FTO).

A pixel defining film PDL may be arranged on the first electrode AE. The pixel defining film PDL may be arranged between the pixel areas, and may expose the first electrode AE. Further, the pixel defining film PDL may be superimposed on an edge portion of the first electrode AE. Therefore, the pixel defining film PDL may expose most of the surface of the first electrode AE which faces the second substrate 120.

The pixel defining film PDL may contain an organic insulating material. For example, the pixel defining film PDL may contain at least one of polystyrene, polymethylmethacrylate (PMMA), polyacrylonitrile (PAN), polyamide (PA), polyimide (PI), polyarylether (PAE), heterocyclic polymer, parylene, epoxy, benzocyclobutene (BCB), siloxane based resin and silane based resin.

The light emitting layer EL may be arranged on the exposed surface of the first electrode AE. The light emitting layer EL may have a multiple-layered thin film structure that includes at least one light generation layer LGL. For example, the light emitting layer EL may include a hole injection layer HIL for injecting holes, a hole transport layer HTL that has desirable hole transportability and that restrains the movement of electrons that weren't able to be combined on the light generation layer so as to increase the opportunity of re-combination between the holes and electrons, a light generation layer that emits light by the re-combination of the injected electrons and holes, a hole blocking layer HBL for restraining the movement of the holes that weren't able to be combined on the light generation layer, an electron transport layer ETL for smoothly transporting the electrons to the light generation layer, and an electron injection layer EIL for injecting the electrons.

Color of the light generated in the light generation layer may be one of red, green, blue and white, but there is no limitation thereto. For example, the color of the light generated in the light generation layer of the light emitting layer EL may be one of magenta, cyan, and yellow.

The hole injection layer, the hole transport layer, the hole blocking layer, the electron transport layer and the electron injection layer may be a common film that extends across multiple pixel areas.

The second electrode CE may be arranged on the light emitting layer EL.

The second electrode CE may be a semi-transmission reflecting film. For example, the second electrode CE may be a thin-type metal layer barely having a thickness enough to transmit light. The second electrode CE may transmit a portion of the light generated in the light generation layer, and reflect the rest of the light generated in the light generation layer.

The second electrode CE may contain a material having a lower work function as compared to the transparent conductive film. For example, the second electrode CE may contain at least one of molybdenum (Mo), tungsten (W), silver (Ag), magnesium (Mg), aluminum (Al), platinum (Pt), palladium (Pd), gold (Au), nickel (Ni), neodymium (Nd), iridium (Ir), chrome (Cr), lithium (Li), calcium (Ca), and an alloy thereof.

A portion of the light emitted from the light emitting layer EL may not penetrate the second electrode CE, and the light reflected by the second electrode CE may be reflected again by the reflecting film. That is, the light emitted from the light emitting layer EL may resonate between the reflecting film and the second electrode CE. By such resonance, the light extraction efficiency of the display elements DD may be improved.

The distance between the reflecting film and the second electrode CE may differ depending on the color of the light generated in the light generating layer. That is, the distance between the reflecting film and the second electrode CE may be adjusted to be suitable to the resonance distance depending on the color of the light generated in the light generating layer.

An encapsulating layer ECL may be arranged on the second electrode CE. The encapsulating layer ECL may prevent oxygen and moisture from infiltrating into the display elements DD. The encapsulating layer ECL may include a plurality of inorganic films (not illustrated) and a plurality of organic films (not illustrated). For example, the encapsulating layer ECL may include a plurality of unit encapsulating layers that include the inorganic film and the organic film arranged on the inorganic film. Further, the encapsulating layer ECL may contain two inorganic films, e.g. an upper and lower inorganic film. The inorganic film may contain at least one of silicon oxide, silicon nitride, silicon oxynitride, aluminum oxide, titanium oxide, zirconium oxide, and tin oxide.

The second substrate 120 may isolate the display elements DD from the external environment. Further, the second electrode 120 may contain the same material as the base substrate SUB. The second electrode 120 may be coupled to the first substrate 110 by a sealant (not illustrated).

The touch screen TSP may be arranged on one surface of the second substrate 120, for example on an outer surface of the second substrate 120. The touch screen TSP may include an active area SA, and a non-active area NSA arranged to be adjacent to the active area SA.

The active area SA may correspond to the display area DA of the first substrate 110. The non-active area NSA may correspond to the non-display area NDA of the first substrate 110. Further, the active area SA may include a fingerprint recognition area FS, and the fingerprint recognition area FS may be arranged at the edge portion of the active area SA.

Touch sensing electrodes TSE may be arranged in the active area SA. The touch sensing electrodes TSE may include first sensing electrodes TSE1 arranged in the active area SA outside the fingerprint recognition area FS, and at least one second sensing electrode TSE2 arranged in the fingerprint recognition area FS.

The first sensing electrodes TSE1 may include a transparent conductive oxide. Further, the first sensing electrodes TSE1 may include a conductive mesh. More specifically, the first sensing electrodes TSE1 may include a plurality of conductive fine lines CFL that intersect each other. The conductive fine lines CFL may include a plurality of first conductive fine lines CFL1 extending in one direction, and a plurality of second conductive fine lines CFL2 extending in a direction intersecting the first conductive fine lines CFL1.

The first conductive fine lines CFL1 and the second conductive fine lines CFL2 may be arranged between the pixel areas. The first conductive fine lines CFL1 and the second conductive fine lines CFL2 may be arranged on a same layer, for example, on the second substrate 120.

The second sensing electrode TSE2 may not only sense a user's touch but also recognize the user's fingerprint. The second sensing electrode TSE2 may include a plurality of sub electrodes SUBE1, SUBE2. For example, the second sensing electrode TSE2 may include a plurality of first sub electrodes SUBE1 extending in a direction inclined to an edge portion of the active area, and a plurality of second sub electrodes SUBE2 extending in a direction intersecting the first sub electrodes SUBE1.

The first sub electrodes SUBE1 and the second sub electrodes SUBE2 may be arranged on different layers from each other. For example, the first sub electrodes SUBE1 may be arranged on the same layer as the conductive fine lines CFL. Further, the insulating film IL may be arranged to cover the first sub electrodes SUBE1. The second sub electrodes SUBE2 may then be arranged on the insulating film IL.

Further, a wiring density of the first sub electrodes SUBE1 and the second sub electrodes SUBE2 may be greater than a wiring density of the first conductive fine lines CFL1 and the second conductive fine lines CFL2. For example, the wiring density of the first sub electrodes SUBE1 and the second sub electrodes SUBE2 may be twice or more than that of the wiring density of the first conductive fine lines CFL1 and the second conductive fine lines CFL2.

At points where the first sub electrodes SUBE1 and the second sub electrodes SUBE2 intersect each other, the first sub electrodes SUBE1 and the second sub electrodes SUBE2 may form capacitors. Therefore, in the fingerprint recognition area FS, by measuring changes in the capacitance of the capacitors, the first sub electrodes SUBE1 and the second sub electrodes SUBE2 may recognize a fingerprint pattern of the user's finger while at the same time also sensing the user's touch.

The first sub electrodes SUBE1 and the second sub electrodes SUBE2 may be connected to the pad portion PDA by the fingerprint recognition lines FSL. For example, the first sub electrodes SUBE1 may be connected to a first group of fingerprint recognition lines, and the second sub electrodes SUBE2 may be connected to a second group of fingerprint recognition lines. Here, the first fingerprint recognition lines and the second fingerprint recognition lines may extend in the same direction. That is, the first fingerprint recognition lines and the second fingerprint recognition lines may be arranged only along one side of the active area SA. Therefore, there is little concern that the fingerprint recognition lines FSL will contact the sensing lines SL connected to the touch sensing electrodes TSE.

Hereinafter, a display device according to other embodiments of the present disclosure will be explained with reference to FIGS. 12 to 19. Referring to FIGS. 12 to 19, same reference numerals will be used for elements that are the same as those illustrated in FIGS. 1 to 11, and to avoid redundancy only brief explanation will be made thereof. In particular, referring to FIGS. 12 to 19, explanation will be made with the main focus on the differences from FIGS. 1 to 11, to prevent repetition of explanation.

FIG. 12 is a plan view provided to explain an active area of a touch screen applied to a display device according to another embodiment of the present disclosure, and FIG. 13 is an enlarged view of area EA2 of FIG. 12.

Referring to FIGS. 1, 2, 8, and 10 to 13, the active area SA of the touch screen TSP may include a fingerprint recognition area FS, and the fingerprint recognition area FS may be arranged at the edge portion of the active area SA. For example, the fingerprint recognition area FS may be arranged on one of four corners of the active area SA.

Touch sensing electrodes TSE may be arranged in the active area SA. The touch sensing electrodes TSE may include first sensing electrodes TSE1 arranged in the active area SA outside the fingerprint recognition area FS, and second sensing electrodes TSE2 arranged in the fingerprint recognition area FS.

The first sensing electrodes TSE1 may include a transparent conductive oxide or a conductive mesh. For example, the first sensing electrodes TSE1 may include a conductive mesh that includes a plurality of conductive fine lines CFL intersecting each other.

The fingerprint recognition area FS may include a plurality of sub fingerprint recognition areas FS1, FS2. For example, the fingerprint recognition area FS may include a first sub fingerprint recognition area FS1 and a second sub fingerprint recognition area FS2 that are adjacent to each other. The second sensing electrodes TSE2 may each be arranged in the first sub fingerprint recognition area FS1 and the second sub fingerprint recognition area FS2. The second sensing electrode TSE2 arranged in the first sub fingerprint recognition area FS1 and the second sensing electrode TSE2 arranged in the second sub fingerprint recognition area FS2 may be electrically insulated from each other, as shown in FIG. 13.

The second sensing electrodes TSE2 may include a plurality of sub electrodes SUBE1, SUBE2. For example, the second sensing electrodes TSE2 may include a plurality of first sub electrodes SUBE1 extending in a direction inclined with respect to the edge portion of the active area SA, and a plurality of second sub electrodes SUBE2 extending in a direction intersecting the first sub electrodes SUBE1. An insulating film may be arranged between the first sub electrodes SUBE1 and the second sub electrodes SUBE2.

A wiring density of the first sub electrodes SUBE1 and the second sub electrodes SUBE2 may be greater than a wiring density of the conductive fine lines CFL. For example, the wiring density of the first sub electrodes SUBE1 and the second sub electrodes SUBE2 may be twice or more than that of the wiring density of the conductive fine lines CFL.

The first sub electrodes SUBE1 and the second sub electrodes SUBE2 may form a plurality of capacitors at points intersecting each other. Therefore, in the fingerprint recognition area FS, by measuring changes in the capacitance of the capacitors, the first sub electrodes SUBE1 and the second sub electrodes SUBE2 may recognize a pattern of the user's fingerprint while at the same time also sensing the user's touch.

The first sub electrodes SUBE1 and the second sub electrodes SUBE2 may be connected to the pad portion PDA by the fingerprint recognition lines FSL. For example, the first sub electrodes SUBE1 may be connected to first fingerprint recognition lines, and the second sub electrodes SUBE2 may be connected to second fingerprint recognition lines.

The first fingerprint recognition lines and the second fingerprint recognition lines of the first fingerprint recognition area FS1 may all extend in the same direction. For example, the first fingerprint recognition lines and the second fingerprint recognition lines of the first fingerprint recognition area FS1 may extend in a rear side direction of the active area SA.

Further, the first fingerprint recognition lines and the second fingerprint recognition lines of the second fingerprint recognition area FS2 may extend in a direction intersecting the direction in which the first fingerprint recognition lines and the second fingerprint recognition lines of the first fingerprint recognition area FS1 extend. For example, the first fingerprint recognition lines and the second fingerprint recognition lines of the second fingerprint recognition area FS2 may extend in a right side direction of the active area SA.

FIG. 14 is a plan view provided to explain the active area of the touch screen TSP applied to a display device according to yet another embodiment of the present disclosure, and FIG. 15 is an enlarged view provided to explain the fingerprint recognition area of FIG. 14.

Referring to FIG. 1, FIG. 2, FIG. 8, FIG. 10, FIG. 11, FIG. 14 and FIG. 15, the active area SA of the touch screen TSP may include the fingerprint recognition area FS, and the fingerprint recognition area FS may be arranged at the edge portion of the active area SA.

The touch sensing electrodes TSE may be arranged in the active area SA. The touch sensing electrodes TSE may include the first sensing electrodes TSE1 arranged in the active area SA outside the fingerprint recognition area FS, and the second sensing electrodes TSE2 arranged in the fingerprint recognition area FS.

The first sensing electrodes TSE1 may include a transparent conductive oxide or a conductive mesh. For example, the first sensing electrodes TSE1 may include a conductive mesh including a plurality of conductive fine lines CFL intersecting each other.

The fingerprint recognition area FS may include a plurality of sub fingerprint recognition areas FS1, FS2, FS3. For example, the fingerprint recognition area FS may include a first sub fingerprint recognition area FS1, a second sub fingerprint recognition area FS2, and a third sub fingerprint recognition area FS3. Here, the second sub fingerprint recognition area FS2 and the third sub fingerprint recognition area FS3 may be arranged at both opposing sides of the first sub fingerprint recognition area FS1.

The second sensing electrodes TSE2 may include a plurality of sub electrodes SUBE1, SUBE2. For example, the second sensing electrodes TSE2 may include a plurality of first sub electrodes SUBE1 extending in one direction, and a plurality of second sub electrodes SUBE2 extending in a direction intersecting the first sub electrodes SUBE1. The insulating film IL may be arranged between the first sub electrodes SUBE1 and the second sub electrodes SUBE2.

The first sub electrodes SUBE1 and the second sub electrodes SUBE2 arranged in the first sub fingerprint recognition area FS1 may extend to the second sub fingerprint recognition area FS2 and the third sub fingerprint recognition area FS3. For example, the first sub electrodes SUBE2 arranged in the first sub fingerprint recognition area FS1 may extend to the third sub fingerprint recognition area FS3, and the second sub electrodes SUBE2 arranged in the first sub fingerprint recognition area FS1 may extend to the second sub fingerprint recognition area FS2.

A portion of the first sub electrodes SUBE1 of the second sub fingerprint recognition area FS2 may be electrically connected to a portion of the second sub electrodes SUBE2 through a contact hole CNT. Further, a portion of the second sub electrodes SUBE2 of the third sub fingerprint recognition area FS3 may be electrically connected to a portion of the first sub electrodes SUBE1 through a contact hole CNT.

Therefore, the number of the first fingerprint recognition lines being connected to the first sub electrodes SUBE1 of the second sub fingerprint recognition area FS2 may decrease. Further, the number of the second fingerprint recognition lines being connected to the second sub electrodes SUBE2 of the third sub fingerprint recognition area FS3 may also decrease.

Further, the wiring density of the first sub electrodes SUBE1 and the second sub electrodes SUBE2 may be greater than the wiring density of the conductive fine lines CFL. For example, the wiring density of the first sub electrodes SUBE1 and the second sub electrodes SUBE2 may be twice or more than that of the wiring density of the conductive fine lines CFL.

At the points where the first sub electrodes SUBE1 and the second sub electrodes SUBE2 intersect each other, the first sub electrodes SUBE1 and the second sub electrodes SUBE2 may form capacitors. Therefore, in the fingerprint recognition area FS, by measuring changes of the capacitance of the capacitors, the first sub electrodes SUBE1 and the second sub electrodes SUBE2 may recognize the fingerprint pattern of the user's finger while at the same time also sensing the user's touch.

FIG. 16 is a plan view provided to explain the active area of the touch screen applied to a display device according to yet another embodiment of the present disclosure, and FIG. 17 is an enlarged view of fingerprint recognition area FS of FIG. 16.

Referring to FIG. 1, FIG. 2, FIG. 8, FIG. 10, FIG. 11, FIG. 16 and FIG. 17, the active area SA of the touch screen TSP may include the fingerprint recognition area FS, and the fingerprint recognition area FS may be arranged at the edge portion of the active area SA.

The touch sensing electrodes TSE may be arranged in the active area SA. The touch sensing electrodes TSE may include a plurality of first sensing electrodes TSE1 and a second sensing electrode TSE2 arranged only in the fingerprint recognition area FS.

The first sensing electrodes TSE1 may include a plurality of X electrodes TSEX extending in an X axis direction and a plurality of Y electrodes TSEY extending in a Y axis direction. Further, the X electrodes TSEX and the Y electrodes TSEY may include a transparent conductive oxide or a conductive mesh.

A portion of the X electrodes TSEX and the Y electrodes TSEY may extend to the fingerprint recognition area FS. A width of the X electrodes TSEX and the Y electrodes TSEY in the fingerprint recognition area FS may be smaller than a width of the X electrodes TSEX and the Y electrodes TSEY in another area.

The second sensing electrode TSE2 may include a plurality of sub electrodes extending in a direction parallel to one of the X electrodes TSEX and the Y electrodes TSEY. For example, the sub electrodes may extend in a direction parallel to the X electrodes TSEX, as shown in FIG. 17.

The sub electrodes may be arranged between adjacent X electrodes TSEX. The wiring density of the sub electrodes may be greater than the wiring density of the X electrodes TSEX and the Y electrodes TSEY. For example, the wiring density of the sub electrodes may be twice or more that of the wiring density of the X electrodes TSEX and the Y electrodes TSEY.

The sub electrodes may each be connected to the pad portion PDA by one of the fingerprint recognition lines FSL. The sub electrodes and the fingerprint recognition lines FSL may be arranged on different layers from each other. For example, the sub electrodes may be arranged on the same layer as the X electrodes TSEX, and the fingerprint recognition lines FSL may be arranged on the same layer as the Y electrodes TSEY. Further, the sub electrodes and the fingerprint recognition lines FSL may be respectively and electrically connected to each other through contact holes CNT.

The fingerprint recognition lines FSL may all extend in the same direction. For example, the fingerprint recognition lines may extend in a direction parallel to the Y electrodes TSEY. Therefore, the X electrodes TSEX, the Y electrodes TSEY, the sub electrodes and the fingerprint recognition lines FSL may intersect each other. At the points where the sub electrodes and the fingerprint recognition lines FSL intersect each other, the sub electrodes and the fingerprint recognition lines FSL may form capacitors. Therefore, in the fingerprint recognition area FS, by measuring changes in the capacitance of the capacitors, the first sensing electrodes TSE1, the sub electrodes and the fingerprint recognition lines FSL may recognize a fingerprint pattern of the user's finger at the same time of sensing the user's touch.

FIG. 18 is a plan view provided to explain the active area of the touch screen applied to a display device according to yet another embodiment of the present disclosure, and FIG. 19 is an enlarged view of fingerprint recognition area FS of FIG. 18.

Referring to FIG. 1, FIG. 2, FIG. 8, FIG. 10, FIG. 11, FIG. 18 and FIG. 19, the active area SA of the touch screen TSP may include a fingerprint recognition area FS, and the fingerprint recognition area FS may be arranged at the edge portion of the active area SA.

Touch sensing electrodes TSE may be arranged in the active area SA. The touch sensing electrodes TSE may include a plurality of first sensing electrodes TSE1 and second sensing electrodes TSE2 arranged only in the fingerprint recognition area FS.

The first sensing electrodes TSE1 may include a plurality of X electrodes TSEX extending in an X axis direction, and a plurality of Y electrodes TSEY extending in a Y axis direction. Further, the X electrodes TSEX and the Y electrodes TSEY may include a plurality of sub conductive lines CL.

A portion of the X electrodes TSEX and the Y electrodes TSEY may extend to the fingerprint recognition area FS.

The second sensing electrodes TSE2 may include sub electrodes that extend in a direction parallel to one of the X electrodes TSEX and the Y electrodes TSEY. For example, the sub electrodes may extend in a direction parallel to the X electrodes TSEX.

The sub electrodes may be arranged between adjacent sub conductive lines CL of the X electrodes TSEX. The wiring density of the sub electrodes may be greater than the wiring density of the X electrodes TSEX and the Y electrodes TSEY. For example, the wiring density of the sub electrodes may be twice or more than that of the wiring density of the X electrodes TSEX and the Y electrodes TSEY. That is, between the mutually adjacent sub conductive lines CL of the X electrodes TSEX, two or more of the sub electrodes may be arranged.

The sub electrodes may be connected to each pad portion PDA by the fingerprint recognition lines FSL. The sub electrodes and the fingerprint recognition lines FSL may be arranged on different layers from each other. For example, the sub electrodes may be arranged on the same layer as the X electrodes TSEX, and the fingerprint recognition lines FSL may be arranged on the same layer as the Y electrodes TSEY. Furthermore, the sub electrodes and the fingerprint recognition lines FSL may be respectively and electrically connected to each other through the contact holes CNT.

The fingerprint recognition lines FSL may all extend in the same direction. For example, the fingerprint recognition lines may extend in a direction parallel to the Y electrodes TSEY. Therefore, the X electrodes TSEX and the Y electrodes TSEY may intersect each other, and the sub electrodes and the fingerprint recognition lines FSL may intersect each other. At points where the sub electrodes and the fingerprint recognition lines FSL intersect each other, the sub electrodes and the fingerprint recognition lines FSL may form capacitors. Therefore, in the fingerprint recognition area FS, by measuring changes in the capacitance of the capacitors, the first sensing electrodes TSE1, the sub electrodes and the fingerprint recognition lines FSL may recognize a fingerprint pattern of a user's finger at the same time as sensing of the user's touch.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims. Various features of the above described and other embodiments can thus be mixed and matched in any manner, to produce further embodiments consistent with the invention.

What is claimed is:

1. A touch screen comprising:
   a substrate including an active area and a non-active area arranged to be adjacent to the active area, the active area including at least one fingerprint recognition area;
   touch sensing electrodes including first sensing electrodes arranged in the active area and at least one second sensing electrode arranged in the fingerprint recognition area, the at least one second sensing electrode configured for sensing a touch and recognizing a fingerprint; and a pad portion including a plurality of pads which are electrically connected to respective sensing electrodes,
wherein the at least one second sensing electrode comprises:
a plurality of sub electrodes extending in a direction parallel to an edge portion of the active area; and
a plurality of fingerprint recognition lines connecting the plurality of sub electrodes to the pad portion,
wherein the plurality of fingerprint recognition lines arranged in a same fingerprint recognition area extend in a same direction,
wherein the first sensing electrodes comprise a plurality of row (X) electrodes and a plurality of column (Y) electrodes that extend in respective directions intersecting each other,
wherein the plurality of sub electrodes extend in a direction parallel to at least one of the X electrodes and the Y electrodes,
wherein the plurality of fingerprint recognition lines and the plurality of sub electrodes are disposed on different layers from each other and connected to each other through contact holes in the fingerprint recognition area, and
wherein the plurality of fingerprint recognition lines extend in a direction intersecting the plurality of sub electrodes.

2. The touch screen according to claim 1,
wherein a wiring density of the plurality of sub electrodes is greater than a wiring density of the X electrodes and a wiring density of the Y electrodes.

3. The touch screen according to claim 1,
wherein each of the X electrodes and the Y electrodes comprises a plurality of conductive lines oriented parallel to each other, and
wherein a wiring density of the plurality of sub electrodes is greater than a wiring density of the conductive lines.

4. A display device comprising:
a first substrate comprising a plurality of pixel areas;
display elements arranged in the pixel areas on the first substrate;
a second substrate facing the first substrate and including an active area and a non-active area arranged to be adjacent to the active area, the active area including at least one fingerprint recognition area; and
a touch screen arranged on one surface of the second substrate,
wherein the touch screen comprises:
touch sensing electrodes including first sensing electrodes arranged in the active area, and at least one second sensing electrode arranged in the fingerprint recognition area, the at least one second sensing electrode configured for sensing a touch and recognizing a fingerprint; and
a pad portion including a plurality of pads which are electrically connected to respective sensing electrodes,
wherein the at least one second sensing electrode comprises:
a plurality of sub electrodes extending in a direction parallel to an edge portion of the active area; and
a plurality of fingerprint recognition lines connecting the plurality of sub electrodes to the pad portion,
wherein the plurality of fingerprint recognition lines arranged in a same fingerprint recognition area extend in a same direction,
wherein the first sensing electrodes comprise a plurality of row (X) electrodes and a plurality of column (Y) electrodes extending in respective directions intersecting each other,
wherein the plurality of sub electrodes extend in a direction parallel to at least one of the X electrodes and the Y electrodes,
wherein a wiring density of the plurality of sub electrodes is greater than a wiring density of the X electrodes and a wiring density of the Y electrodes,
wherein the fingerprint recognition lines and the plurality of sub electrodes are disposed on different layers from each other and connected to each other through contact holes in the fingerprint recognition area, and
wherein the plurality of fingerprint recognition lines extend in a direction intersecting the plurality of sub electrodes.

5. A touch screen comprising:
a substrate including an active area and a non-active area arranged to be adjacent to the active area, the active area including at least one fingerprint recognition area;
touch sensing electrodes including first sensing electrodes arranged in the active area and at least one second sensing electrode arranged in the fingerprint recognition area, the at least one second sensing electrode configured for sensing a touch and recognizing a fingerprint; and
a pad portion including a plurality of pads which is electrically connected to respective sensing electrodes,
wherein the at least one second sensing electrode comprises:
a plurality of sub electrodes extending in one direction; and
a plurality of fingerprint recognition lines connecting the plurality of sub electrodes to the pad portion,
wherein the plurality of fingerprint recognition lines arranged in a same fingerprint recognition area extend in a same direction,
wherein the first sensing electrodes comprise a plurality of row (X) electrodes and a plurality of column (Y) electrodes extending in respective directions intersecting each other,
wherein the plurality of sub electrodes extend in a direction parallel to at least one of the X electrodes and the Y electrodes,
wherein a wiring density of the plurality of sub electrodes is greater than a wiring density of the X electrodes and a wiring density of the Y electrodes,
wherein the plurality of fingerprint recognition lines and the plurality of sub electrodes are disposed on different layers from each other and connected to each other through contact holes in the fingerprint recognition area, and
wherein the plurality of fingerprint recognition lines extend in a direction intersecting the plurality of sub electrodes.

* * * * *